United States Patent

Dunn

[15] 3,686,353

[45] Aug. 22, 1972

[54] CATALYTIC DIMERIZATION OF OLEFINS WITH COBALT COMPLEXES
[72] Inventor: Howard E. Dunn, Evansville, Ind.
[73] Assignee: Phillips Petroleum Company
[22] Filed: June 18, 1970
[21] Appl. No.: 47,633

[52] U.S. Cl.....260/683.15 D, 252/431 N, 252/431 P
[51] Int. Cl.................................................C07c 3/10
[58] Field of Search..............................260/683.15 D

[56] References Cited

UNITED STATES PATENTS 3,482,001  12/1969  Eberhardt.............260/683.15
3,511,891  5/1970  Taylor et al. .........260/683.15

FOREIGN PATENTS OR APPLICATIONS 62,561  7/1968  Germany..............260/683.15

Primary Examiner—Paul M. Coughlan, Jr.
Attorney—Young and Quigg

[57] ABSTRACT

A catalytic process for the dimerization of olefins utilizing a cobalt(II) complex activated by the presence of an alkylaluminum halide. Propylene is dimerized with a catalyst prepared by mixing bis(quinoline)dibromocobalt(II) and ethylaluminum dichloride in chlorobenzene.

7 Claims, No Drawings

CATALYTIC DIMERIZATION OF OLEFINS WITH COBALT COMPLEXES

This invention relates to the catalytic dimerization of monoolefins by the use of a cobalt (II) complex in the presence of an alkylaluminum halide activator. This invention in another aspect relates to the catalytic dimerization of propylene by the use of activated cobalt(II) complexes.

Dimerization of lower aliphatic monoolefins, for example, propylene, is of interest to the art. Of particular importance is the conversion of propylene into linear hexenes. These linear hexenes can be converted into oxo-alcohols to be used as plasticizers, or dimerized to dodecanes which would be useful as detergent intermediates.

Cationic dimerization systems for propylene have been found to give 2-methylpentenes and 3-methylpentenes as the major products. These reactions are usually accompanied by a considerable amount of polymer formation. Anionic dimerization of propylene gives 4-methylpentene-1 as the major product. These reactions are usually carried out in hydrocarbon dispersions of alkali metals and require relatively high temperature. Also, long induction period requirements are common in anionic dimerizations. Most common methods of olefin dimerization require rather severe reaction conditions favoring the production of branched products.

It is an object of this invention to provide an olefin dimerization process that is operative under mild conditions.

I have found that olefins, for example, propylene can be dimerized over a catalyst comprising $L_2CoX_2$ wherein L represents ligand, Co represents cobalt, and X represents halogen; when the aforementioned complex has been activated by the presence of an alkylaluminum halide. This dimerization process can be carried out under very mild conditions. The various activated cobalt(II) complexes used in the dimerization process of my invention produced isomer distributions with very little variation.

The olefins to which the present dimerization process is directed include cyclic monoolefins having up to about 12 carbon atoms per molecule and acyclic monoolefins having from about two to 12 carbon atoms, inclusive, where the acyclic monoolefin can be a terminal or internal olefin, branched or unbranched. Examples of suitable monoolefins which can be used according to the present invention are ethylene, propylene, butene-1, butene-2, pentene-1, pentene-2, cyclopentene, cyclohexene, 3,4,5-trimethylcyclohexene, 3-methylbutene-1, cycloheptene, hexene-2, heptene-1, cyclooctene, 4,4-dimethylheptene-2, decene-1, dodecene-1, and the like and mixtures thereof.

Activated cobalt complexes containing a variety of ligands, for example, amines and phosphines can be used as dimerization catalysts for the aforementioned olefins.

Examination of the results of my process indicated that even though the ligand was varied the distribution of the isometric product stayed relatively constant. The cobalt catalyst complexes used in the method of my invention were carried in suitable halogenated hydrocarbon solvents, for example chlorobenzene, and were activated with methylaluminum sesquichloride or ethylaluminum dichloride. The rates of dimerization of propylene over cobalt catalyst complexes activated by the two aforementioned activators were essentially equal and the variance of activator had very little effect on the isomer distribution of the products. Other alkylaluminum halides which can be used are diethylaluminum chloride, dihexylaluminum bromide, dimethylaluminum chloride, methylaluminum chloride and the like. The process of my invention requires an aluminum to cobalt gram atom ratio of at least 6:1 in order to activate the cobalt catalyst. Gram atom ratios below 6:1 yielded a dead or only slightly active catalyst and with ratios above about 9:1, having little effect on the dimerization rate.

The temperature of my invention may vary broadly from −25° to 125° C. The monoolefin pressure can range from 1 to 150 psig or to the liquification pressure at operating temperature. The concentration of the cobalt(II) complex in the solvent is not critical and can range from one-millionth molar to the saturation point, preferably being about 0.1 to 0.00001 molar.

Soluble cobalt(II) complexes were used in the process of my invention to dimerize olefins, for example propylene. These soluble, cobalt complexes were selected from bis(pyridine, phosphine, or quinoline)dihalocobalt(II) compounds. The aforementioned cobalt(II) complexes were activated by the presence of alkylaluminum halides therefor carried in halogenated hydrocarbon solvents.

The following six examples are intended for illustrative purposes and are not intended to limit the scope of the process of my invention.

EXAMPLE I

Propylene (30 psig) was pressured into a 7 oz. glass reactor containing bis(4-ethylpyridine)dibromocobalt(II) (0.0433 g., 0.1 mmol), chlorobenzene (20 ml) and 1 ml (1 mmol) of a 1 M ethylaluminum dichloride solution in chlorobenzene. The reaction was carried out for 18.5 hours at about 10° to 25° C. with the propylene pressure maintained at 30 psig. Deionized water (10 ml) was added, the organic layer was decanted, and distilled at atmospheric pressure: bp 50°–60° C., 4.50 g.

A 1.25 g. sample of the above distillate was placed over 0.0195 g. of platinum oxide and hydrogen was supplied at 30 psig for 4.75 hours to insure complete reduction. Analysis (glpc) of the resulting hexanes indicated the composition of the hexene product mixture was: 2-methylpentenes, 67.3 percent; n-hexenes, 30.7 percent; 2,3-dimethylbutenes, 1.4 percent; and 3-methylpentenes, 0.6 percent.

EXAMPLE II

Propylene (30 psig) was pressured into a 7 oz. glass reactor containing bis(quinoline)dibromocobalt(II) (0.1173 g., 0.1 mmol), chlorobenzene (20 ml), and 1 ml of a 1 M ethylaluminum dichloride solution in chlorobenzene. (The propylene was pressured into the reactor after the other above-named components had been stirred at room temperature for 2 minutes.) The reaction was carried out at 23.2°–24.2° C. for 6 hours at 30 psig propylene. Deionized water (2 ml) was added, the organic layer was decanted and was distilled at atmospheric pressure: bp 60°–67° C.; hexene fraction, 4.52 g.

Reduction over platinum oxide was carried out as above. Analysis (glpc) of the resulting hexanes indicated the composition of the hexene product mixture was: 2-methylpentenes, 70.8 percent; n-hexenes, 25.3 percent; and 2,3-dimethylbutenes, 5.7 percent.

EXAMPLE III

The above procedure employed with bis(quinoline)dibromocobalt(II) was also employed with bis(isoquinoline)dibromocobalt(II). The temperature ranged between 23.2°–24.2° C. over a 6-hour reaction period. Deionized water (2 ml) was added, the organic layer decanted, and distilled at atmospheric pressure: bp 60°–67° C.; hexene fraction, 8.44 g.

A 2 ml quantity of the above hexene fraction was reduced as described above over a 6-hour period. Analysis (glpc) of the resulting hexanes indicated the composition of the hexene product mixture was: 2-methylpentenes, 70.4 percent; n-hexenes, 25.6 percent; 2,3-dimethylbutenes, 4.0 percent.

EXAMPLE IV

Blue bis(pyridine)dichlorocobalt(II) (0.0288 g., 0.1 mmol) was charged to a 7 oz. glass reactor. The reactor was capped and flushed with nitrogen. Chlorobenzene (20 ml) was added immediately. The contents of the reactor were placed under propylene (5 psig) and 1.5 ml of a 1 M ethylaluminum dichloride solution in chlorobenzene was added. The mixture became light blue. Propylene pressure was then increased to 30 psig and maintained there for 2.5 hours at 5.8°–7.8° C. At the end of the reaction period the propylene pressure was reduced to 5 psig and deionized water (10 ml) was added. The organic layer was decanted and distilled at atmospheric pressure: bp 30°–100° C.; therefore hexene fraction, 33.16 g.

A 2 ml fraction of the above distillate was reduced as above over a 5-hour period. Analysis (glpc) of the resulting hexanes indicated the composition of the hexene product mixture was: 2-methylpentenes, 73.1 percent; n-hexenes, 24.8 percent; 2,3-dimethylbutenes, 2.0 percent.

EXAMPLE V

The procedure applied under Example IV above was employed with the mauve form of bis(pyridine)dichlorocobalt(II). The solution was initially mauve but turned blue after approximately 5 minutes. After destroying the catalyst with deionized water, the organic layer was decanted and distilled at atmospheric pressure: bp 53°–100° C.; hexene fraction, 17.24 g.

A 2 ml portion of the hexene fraction was reduced as above for 5 hours. Analysis (glpc) of the resulting hexanes indicated the composition of the hexene product mixture was: 2-methylpentenes, 73.3 percent; n-hexenes, 25.4 percent; 2,3-dimethylbutenes, 1.3 percent.

EXAMPLE VI

Propylene (40 psig) was pressured into a 7 oz. glass reactor containing bis(triphenylphosphine)dibromocobalt(II) (0.0743 g, 0.1 mmol) chlorobenzene (20 ml) and 1 ml (1.0 mmol) of a 1 M ethylaluminum dichloride solution in chlorobenzene. The reaction was allowed to proceed for 6.5 hours at 40 psig propylene. Upon distillation (bp 66°–67.5° C.) a 7.8 g. hexene fraction was collected. Analysis (glpc) of the resulting hexanes following reduction indicated the composition of the hexene product mixture was: 2-methylpentenes, 65.1 percent; n-hexenes, 27.2 percent; 2,3-dimethylbutenes, 6.9 percent; 3-methylpentenes, 0.8 percent.

As will be evident to those skilled in the art, many variations and modifications can be practiced in view of the foregoing disclosure. Such variations and modifications are believed to be within the spirit and scope of the invention.

What I claim is:

1. A catalytic process for the dimerization of olefins, comprising; contacting olefins having from two to 12 carbon atoms per molecule with a bis(quinoline)dihalocobalt(II) complex which has been activated by the presence of an alkylaluminum halide with the aluminum to cobalt gram atom ratio being at least 6:1, wherein both the cobalt(II) complex and the alkylaluminum halide are carried by a halogenated hydrocarbon solvent.

2. A process according to claim 1 wherein the cobalt(II) complex is bis(quinoline)dibromocobalt(II).

3. A process according to claim 1 wherein the alkylaluminum halide is ethylaluminum dichloride.

4. A process according to claim 1 wherein the alkylaluminum halide is methylaluminum sesquichloride.

5. A process according to claim 1 wherein the halogenated hydrocarbon solvent is chlorobenzene.

6. A catalytic process for the dimerization of olefins, comprising; contacting olefins having from two to 12 carbon atoms per molecule with a bis(quinoline)dibromocobalt(II) complex which has been activated by the presence of ethylaluminum dichloride with the aluminum to cobalt gram atom ratio being at least 6:1, wherein both the cobalt(II) complex and the ethylaluminum dichloride are carried by a halogenated hydrocarbon solvent.

7. A process according to claim 6 wherein the halogenated hydrocarbon solvent is chlorobenzene.

* * * * *